US008456541B2

(12) United States Patent
Sambongi

(10) Patent No.: US 8,456,541 B2
(45) Date of Patent: Jun. 4, 2013

(54) IMAGE PROCESSING APPARATUS AND IMAGE PROCESSING PROGRAM

(75) Inventor: Masao Sambongi, Tama (JP)

(73) Assignee: Olympus Corporation, Tokyo (JP)

( * ) Notice: Subject to any disclaimer, the term of this patent is extended or adjusted under 35 U.S.C. 154(b) by 225 days.

(21) Appl. No.: 12/706,200

(22) Filed: Feb. 16, 2010

(65) Prior Publication Data

US 2010/0225782 A1    Sep. 9, 2010

(30) Foreign Application Priority Data

Feb. 18, 2009  (JP) .................. 2009-035599

(51) Int. Cl.
*H04N 5/235* (2006.01)
*H04N 9/68* (2006.01)
*G06K 9/46* (2006.01)
*G06K 9/66* (2006.01)
*G06K 9/40* (2006.01)

(52) U.S. Cl.
USPC ........ 348/230.1; 348/235; 382/191; 382/263; 382/264

(58) Field of Classification Search
USPC ................ 348/222.1, 229.1, 230.1, 234–235; 382/190–191, 263–264
See application file for complete search history.

(56) References Cited

U.S. PATENT DOCUMENTS

2009/0022414 A1*  1/2009  Wei et al. ............. 382/254
2009/0251575 A1* 10/2009  Wada ................... 348/294

FOREIGN PATENT DOCUMENTS

| JP | 05-007336 A | 1/1993 |
| JP | 07-075026 A | 3/1995 |
| JP | 2002158927 A * | 5/2002 |

OTHER PUBLICATIONS

Machine Translation of JP 2002-158927 to Tanabe published May 31, 2002.*

* cited by examiner

*Primary Examiner* — Daniel M Pasiewicz
(74) *Attorney, Agent, or Firm* — Holtz, Holtz, Goodman & Chick, P.C.

(57) ABSTRACT

A plurality of image signals having different exposure levels is acquired; low-frequency components are extracted from each of the image signals to generate a plurality of low-frequency image signals; and the plurality of low-frequency image signals are combined to generate a combined low-frequency image signal. A first image signal is extracted from the plurality of image signals; and high-frequency components are extracted from the first image signal to generate a high-frequency image signal. Then, a combined image signal is generated by combining the combined low-frequency image signal and the high-frequency image signal.

10 Claims, 13 Drawing Sheets

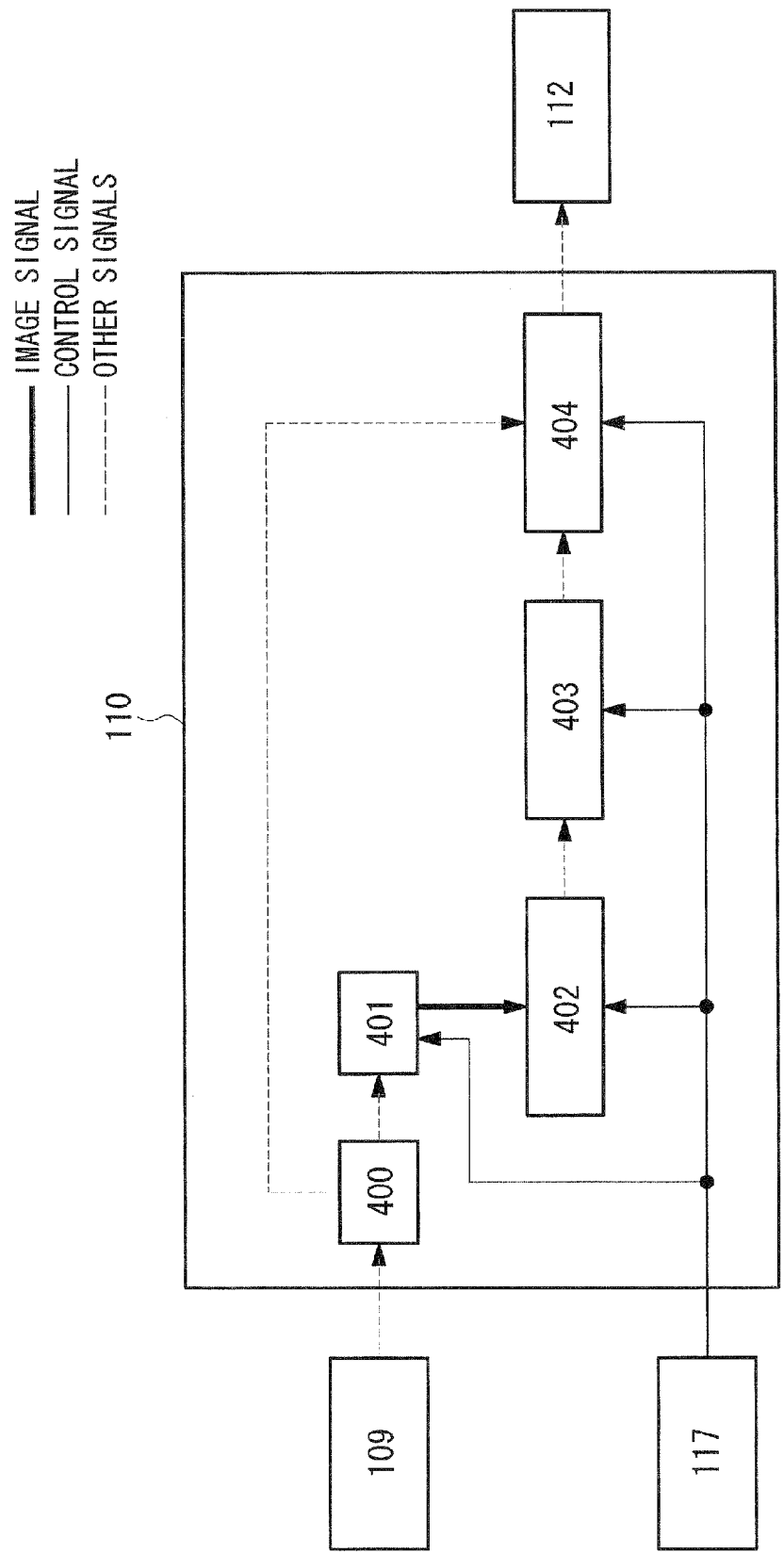

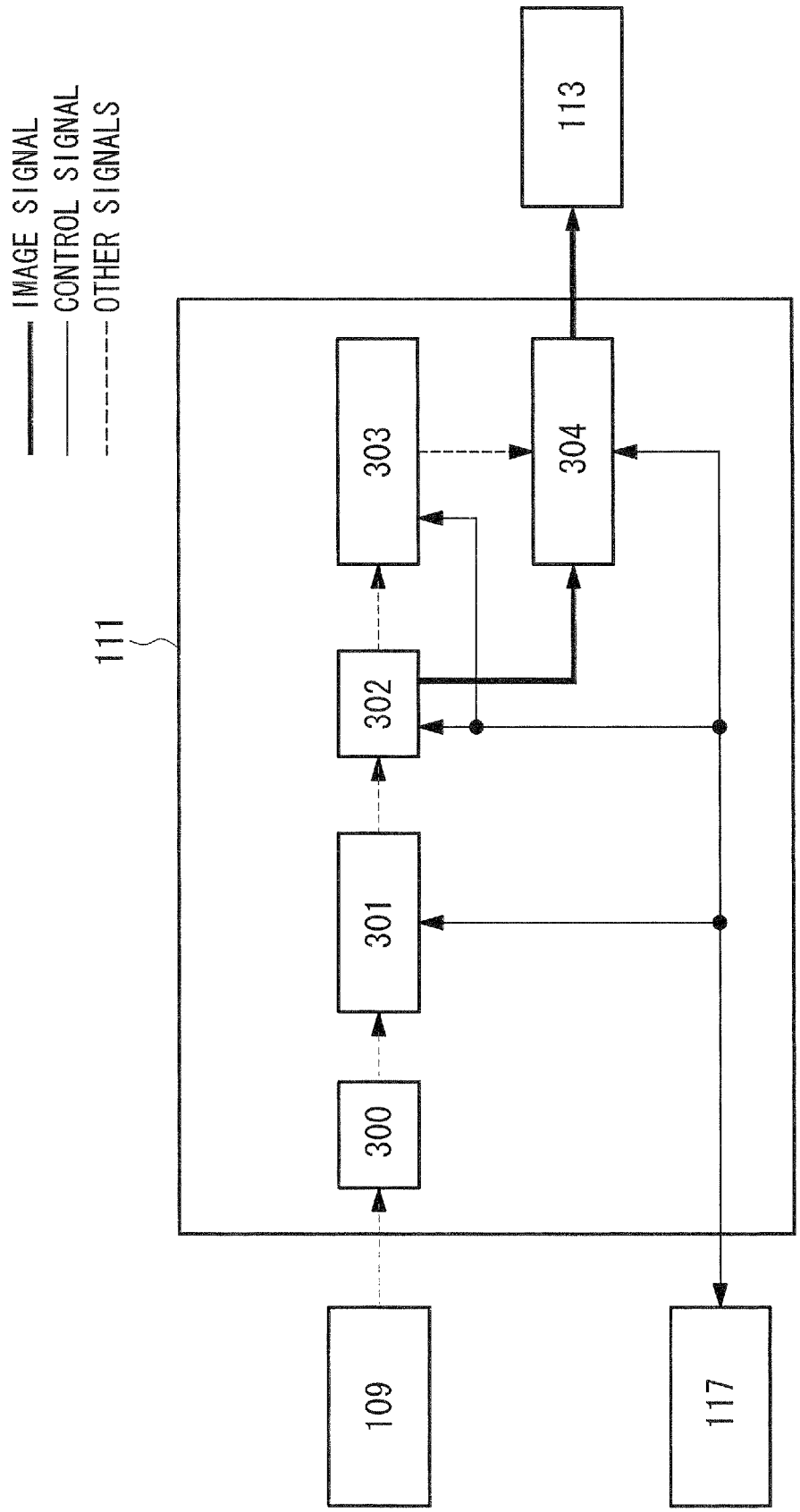

IMAGE PROCESSING APPARATUS AND IMAGE PROCESSING PROGRAM

This application is based on Japanese Patent Application No. 2009-035599 filed Feb. 18, 2009, the content of which is incorporated herein by reference.

BACKGROUND OF THE INVENTION

1. Field of the Invention

The present invention relates to an image processing apparatus that expands the dynamic range of an image signal.

2. Description of Related Art

In general, the dynamic range of various solid-state image-acquisition devices used for electronic cameras, such as CCD image sensors and CMOS-type image sensors, is small compared with the dynamic range of a subject. Thus, in some cases, overexposure occurs in high-luminance sections, and underexposure occurs in low-luminance sections. Accordingly, a method of generating an image having an expanded dynamic range by combining a plurality of image signals having different exposure levels into an image signal for one image has been proposed. However, when a combined image is obtained by acquiring a plurality of images there is a problem in that artifacts, such as double lines, are generated in the combined image signal due to camera shaking, subject shaking, and so on during image acquisition.

BRIEF SUMMARY OF THE INVENTION

Japanese Unexamined Patent Application, Publication No. HEI-7-75026 discloses a method of generating an appropriate wide-dynamic-range image by setting a weight for one of a first luminosity value and a second luminosity value of two images on the basis of either one of the values, even when there is a characteristic change in the camera, a fluctuation in the intensity of illumination, or displacement on the image-acquisition device. Japanese Unexamined Patent Application, Publication No. HEI-5-7336 discloses a method of combining a plurality of images after coordinate transformation.

The present invention provides an image processing apparatus capable of improving image quality by expanding the dynamic range when a combined image, is obtained by acquiring a plurality of images even when the plurality of images includes, for example, displacement due to three-dimensional movement.

A first aspect of the present invention is an image processing apparatus that expands dynamic range by combining a plurality of image signals, the apparatus including an image signal acquiring unit configured to acquire a plurality of image signals having different exposure levels; a low-frequency-image signal generating unit configured to generate a plurality of low-frequency image signals by extracting low-frequency components from each of the image signals; a combined-low-frequency-signal generating unit configured to combine the plurality of low-frequency image signals to generate a combined low-frequency image signal; an extracting unit configured to extract a single image signal from the plurality of image signals; a high-frequency-image signal generating unit configured to extract a high-frequency component from the single image signal to generate a high-frequency image signal; and an image combining unit configured to generate a combined image signal by combining the combined low-frequency image signal and the high-frequency image signal.

A second aspect of the present invention is a recording medium on which an image processing program for expanding dynamic range by combining a plurality of image signals is recorded, the image processing program instructing a computer to execute a step of acquiring a plurality of image signals having different exposure levels; a step of generating a plurality of low-frequency image signals by extracting low-frequency components from each of the image signals; a step of combining the plurality of low-frequency image signals to generate a combined low-frequency image signal; a step of extracting a single image signal from the plurality of image signals; a step of extracting high-frequency components from the single image signal to generate a high-frequency image signal; and a step of generating a combined image signal by combining the combined low-frequency image signal and the high-frequency image signal.

BRIEF DESCRIPTION OF THE SEVERAL VIEWS OF THE DRAWINGS

FIG. 3 is a block diagram illustrating, in outline, the configuration of an extracting unit of the image processing apparatus according to the first embodiment of the present invention.

FIG. 5 is a block diagram illustrating, in outline, the configuration of a low-frequency-component generating unit of the image processing apparatus according to the first embodiment of the present invention.

DETAILED DESCRIPTION OF THE INVENTION

Embodiments of an image processing apparatus according to the present invention will be described below with reference to the drawings.
First Embodiment FIG. 1 is a block diagram illustrating, in outline, the configuration of an image processing apparatus according to a first embodiment of the present invention.

Figure 1:
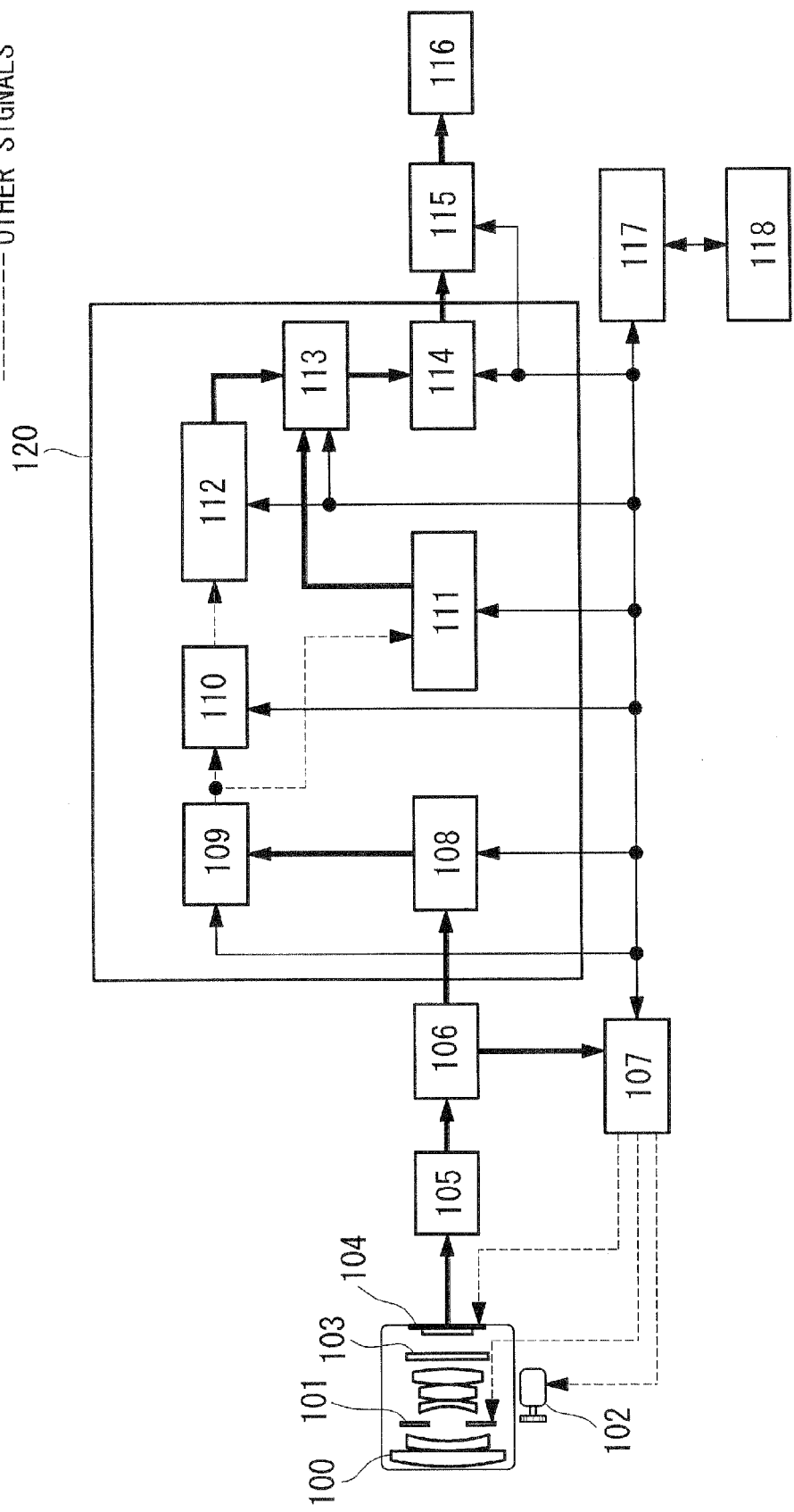
FIG. 1 is a block diagram illustrating, in outline, the configuration of an image processing apparatus according to a first embodiment of the present invention.

As illustrated in FIG. 1, the image processing apparatus according to this embodiment includes a lens system 100, a stop 101, an AF motor 102, a color filter 103, a CCD 104, an A/D converting unit 105, a buffer 106, an image-acquisition control unit 107, an image processing unit 120, a compressing unit 115, an outputting unit 116, a control unit 117, and an external I/F unit 118.

The lens system 100 is positioned such that an image of a subject is formed through the stop 101 and such that the image is formed on the CCD 104, which is an image-acquisition device, through the color filter 103. The AF motor 102 is driven and controlled by the image-acquisition control unit 107, which is described below, and is driven such that the lens system 100 is focused on the subject in response to a control signal from the image-acquisition control unit 107. The CCD 104 generates electrical image information about an image of the subject formed by the lens system 100 and outputs this electrical image information to the A/D converting unit 105. In the description of this embodiment, the CCD 104 uses a single CCD of the ROB primary color system. At the A/D converting unit 105, image information generated at the CCD 104 is converted into an image signal, which is discretized digital data that can be processed in a predetermined manner by the image processing unit 120; the converted image signal is temporarily stored in the buffer 106; and then the signal is output from the buffer 106 to the image processing unit 120. Image signals corresponding to a plurality of images are acquired by repeating the above-described process. The compressing unit 115 compresses the image signal processed in a predetermined manner by the image processing unit 120, which is described below, and outputs the signal to the outputting unit 116.

The image-acquisition control unit 107 detects contrast information in an AF area of the image signal and drives and controls the AF motor 102 so that the contrast is maximized, or drives and controls the AF motor 102 in response to the distance to a main subject measured by, for example, an external infrared sensor (not shown), without acquiring an image signal during preliminary image acquisition. Moreover, the image-acquisition control unit 107 controls the stop 101 and the electronic shutter speed of the CCD 104 to adjust the amount of incident light by using the luminance level in the image signal or a luminance sensor (not shown). The control by the image-acquisition control unit 107 is carried out the same number of times as the number of image acquisitions carried out in the actual image acquisition. In other words, the above-described processing is carried out multiple times; the image signals corresponding to the plurality of images acquired are temporarily stored in the buffer 106; and individual image signals corresponding to one image are output one-by-one in sequence from the buffer 106 to the image processing unit 120.

The control unit 117 is bidirectionally connected to the image-acquisition control unit 107, a signal processing unit 108, a transform unit 109, an extracting unit 110, a low-frequency-component generating unit 111, a high-frequency-component generating unit 112, an image combining unit 113, and a gradation transform unit 114, which are all included in the image processing unit 120 described below, and to a compressing unit 115; and the control unit 117 drives and controls each of these components. The external I/F unit 118 has a power switch, a shutter button, and an interface for switching between various modes during image acquisition.

The image processing unit 120 includes the signal processing unit 108; the transform unit 109; the extracting unit 110; the low-frequency-component generating unit 111, which is a low-frequency-image signal generating unit and a combined-low-frequency-signal generating unit; the high-frequency-component generating unit 112, which is a high-frequency-image signal generating unit; the image combining unit 113; and the gradation transform unit 114.

The signal processing unit 108 reads the single-plane image signal input from the buffer 106 in response to the control of the control unit 117, carries out predetermined image processing, such as interpolation processing, white balance adjustment processing, electronic zoom processing, and noise suppression processing, generates three-plane RGB image signals for each pixel, and outputs these signals to the transform unit 109. Moreover, the RGB signals may be converted to YCbCr signals using the following Equation 1.

$$\begin{bmatrix} Y \\ Cb \\ Cr \end{bmatrix} = \begin{bmatrix} 0.299 & 0.587 & 0.114 \\ -0.1690 & -0.331 & 0.500 \\ 0.500 & -0.419 & -0.081 \end{bmatrix} \begin{bmatrix} R \\ G \\ B \end{bmatrix} \quad \text{[Eq. 1]}$$

Figure 2:
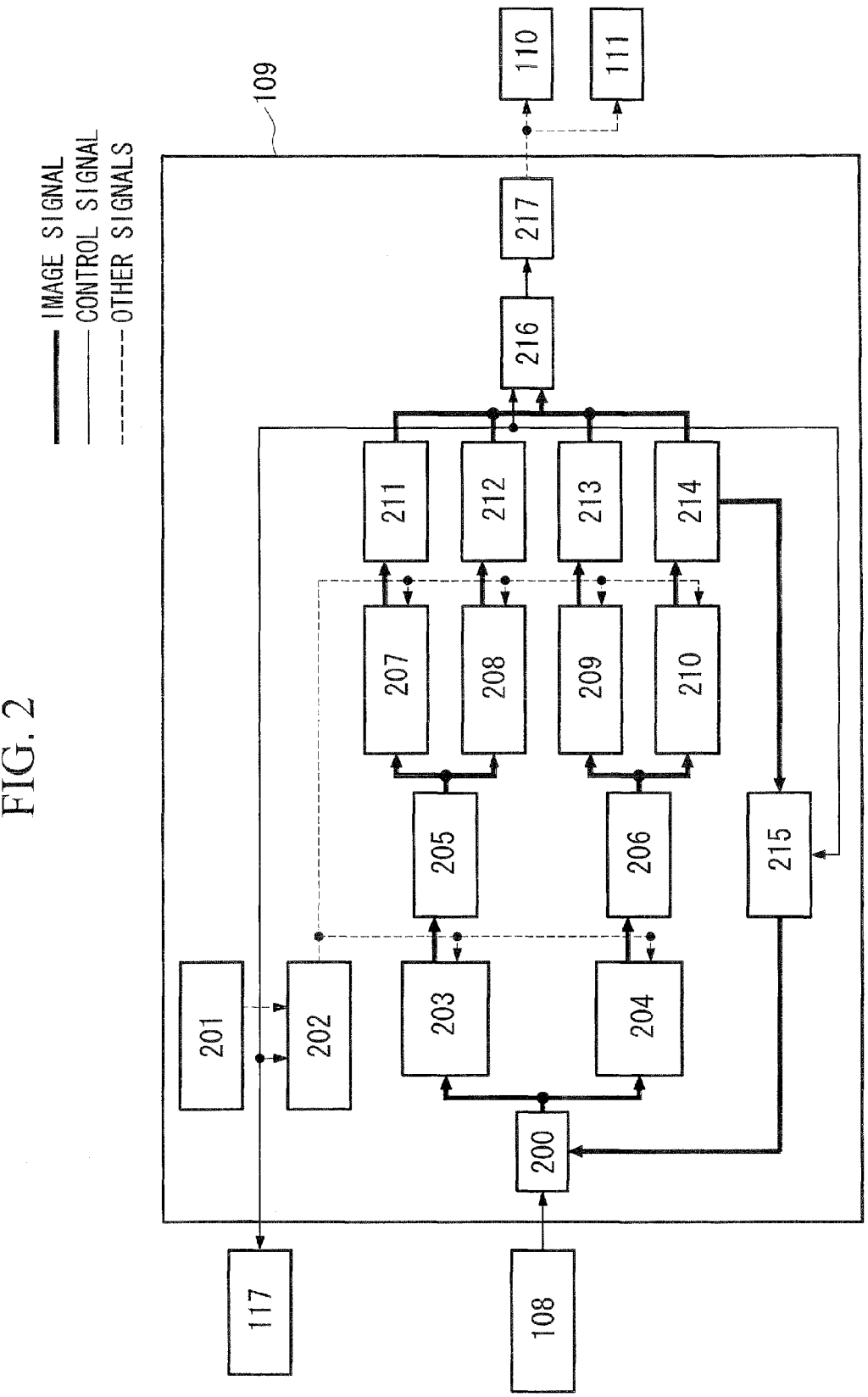
FIG. 2 is a block diagram illustrating, in outline, the configuration of a transform unit of the image processing apparatus according to the first embodiment of the present invention.

The transform unit 109 transforms an input image signal to a frequency signal corresponding to a frequency component and, as shown in FIG. 2b, includes buffers 200 and 217, a ROM 201, a coefficient reading unit 202, a horizontal high-pass filter 203, a horizontal low-pass filter 204, downsampling units 205, 206, 211, 212, 213, and 214, vertical high-pass filters 207 and 209, vertical low-pass filters 208 and 210, and transferring units 215 and 216. Transformation to a frequency signal is possible by carrying out processing associated with Fourier transformation or multiresolution transformation. In this embodiment, however, multiresolution transformation is used.

The image signals transferred from the signal processing unit 108 are temporarily stored in the buffer 200. A stored image signal for an image is transferred to both the horizontal high-pass filter 203 and the horizontal low-pass filter 204. In response to the control of the control unit 117, the coefficient reading unit 202 reads coefficients for high-pass and low-pass filtering processing, which are stored in the ROM 201. The coefficients used for high-pass filtering and low-pass filtering can be, for example, Laplacian or Gaussian. Furthermore, the Daubechies or Haar coefficients for wavelet transformation may be used. In the case of Haar, the coefficients of a high-pass filter h and a low-pass filter l are defined by the following Equations 2 and 3, respectively.

$$h=[0.5,-0.5] \quad \text{[Eq. 2]}$$

$$l=[0.5,0.5] \quad \text{[Eq. 3]}$$

The filter coefficients described above are used during filtering of an image signal in the horizontal and vertical directions. The horizontal high-pass filter 203 uses the high-pass filter coefficient h transferred from the coefficient reading unit 202 to apply the filter h in the horizontal direction of the image signal. The image signal after filtering processing is transferred to the downsampling unit 205. Similarly, the horizontal low-pass filter 204 uses the low-pass filter coefficient l to apply the filter l in the horizontal direction of the image signal. The image signal after filtering processing is transferred to the downsampling unit 206. The downsampling unit 205 and the downsampling unit 206 carry out ½ downsampling on the image signal after filtering processing in the horizontal direction. The downsampling unit 205 transfers the downsampled image signal to the vertical high-pass filter unit 207 and the vertical low-pass filter unit 208, whereas the downsampling unit 206 transfers the downsampled image signal to the vertical high-pass filter units 209 and the vertical low-pass filter 210.

The vertical high-pass filter unit 207 uses the high-pass filter coefficient h transferred from the coefficient reading unit 202 to apply the high-pass filter h in the vertical direction of the image signal. The image signal after filtering processing is transferred to the downsampling unit 211. Similarly, the vertical low-pass filter unit 208 uses the low-pass filter coefficient l to operate the filter l in the vertical direction of the image signal. The image signal after filtering processing is transferred to the downsampling unit 212. Similarly, the vertical high-pass filter unit 209 and the vertical low-pass filter unit 210 operate the filters h and l in the vertical direction and transfer the image signal to the downsampling unit 213 and the downsampling unit 214.

The downsampling unit 211, the downsampling unit 212, the downsampling unit 213, and the downsampling unit 214 carry out ½ downsampling on the image signal after filtering processing in the horizontal direction. The downsampled image signal is transferred to the transferring unit 216.

The downsampling unit 214 transfers the image signal also to the transferring unit 215. The transferring unit 215 transfers the downsampled image signal to the buffer 200 under the control of the control unit 117. Again, horizontal and vertical filtering processing is carried out on the image signal in the buffer 200, i.e., the image signal applied with the horizontal and vertical low-pass filters. The image signal in the downsampling unit 214 is transferred to the transferring unit 215 again, and the same processing is repeated.

The number of times processing for transferring the image signal i from the downsampling unit 214 to the buffer 200 via the transferring unit 215 is to be carried out is controlled by the transferring unit 215 in response to the control of the control unit 117. The number of transfers to be carried out may be set each time an image signal is acquired by an operator or may be set in advance.

The image signal transferred to the transferring unit 216 is transferred to the buffer 217, where it is temporarily stored. When the number of transfers carried out by the transferring unit 215 is one or more, the processing from the buffer 200 to the transferring unit 216 is carried out again, and the signal is stored in the buffer 217. After the transfer processing by the transferring unit 215 is completed, the image signal stored in the buffer 217, i.e., the image signal to which the horizontal and vertical low-pass filters is applied in a multiresolution manner is transferred to the extracting unit 110 and the low-frequency-component generating unit 111.

The extracting unit 110 receives frequency signals associated with the frequency components of the image signals from the transform unit and, on the basis of these, selects and extracts from image signals for multiple images the image signal most suitable for acquiring a combined image. For this reason, as shown in FIG. 3, the extracting unit 110 includes a buffer 400, an inverse-transform unit 401, a histogram computing unit 402, an evaluation-value computing unit 403, and a selecting unit 404.

The frequency signals for a plurality of images received from the transform unit 109 are stored in the buffer 400. The inverse-transform unit 401 carries out inverse Fourier transformation, multiresolution inverse transformation, etc. on the frequency signals in the buffer 400 to inversely transform the frequency signals into image signals in real space. The histogram computing unit 402 reads the image signals inversely transformed at the inverse-transform unit 401 and, on the basis of these, computes a histogram such as that illustrated in FIG. 4. Information about the computed histogram is transferred to the evaluation-value computing unit 403. The evaluation-value computing unit 403 uses the histogram information to compute an evaluation value.

Figure 4A:
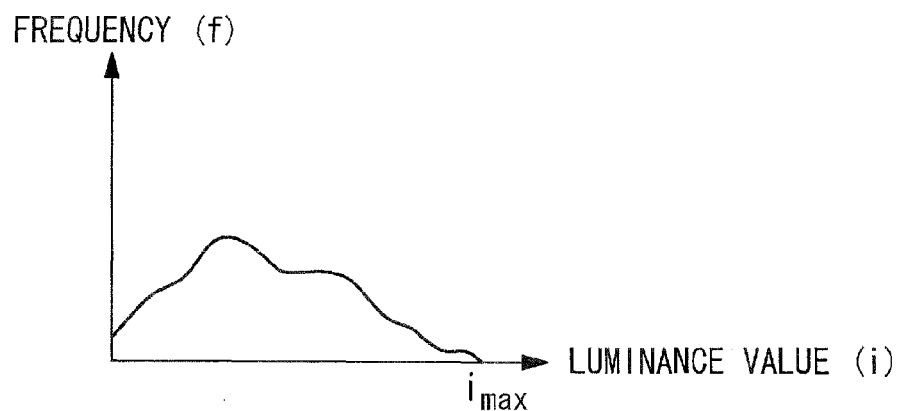
FIG. 4A is an example histogram generated at the extracting unit of the image processing apparatus according to the first embodiment of the present invention and illustrates an example in which an image signal is appropriately exposed.
Figure 4B:
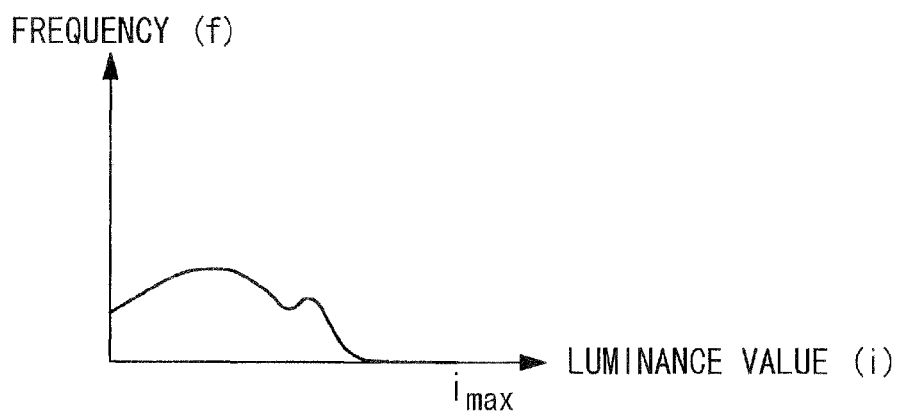
FIG. 4B is an example histogram generated at the extracting unit of the image processing apparatus according to the first embodiment of the present invention and illustrates an example in which underexposure and overexposure occur in the image signal.
Figure 4C:
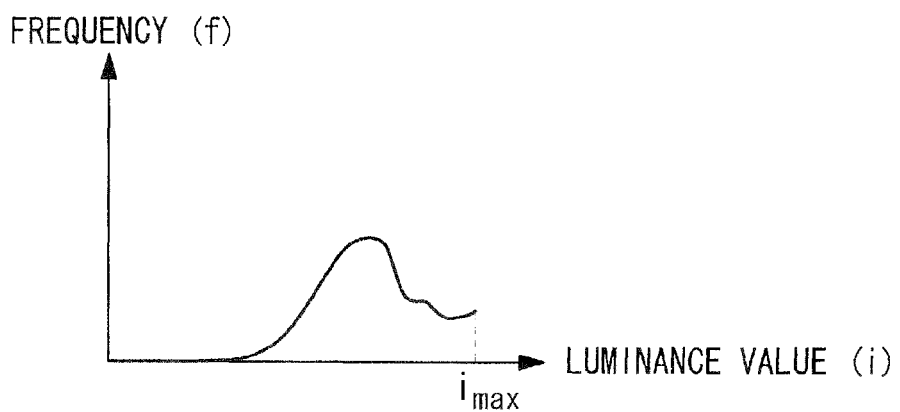
FIG. 4C is an example histogram generated at the extracting unit of the image processing apparatus according to the first embodiment of the present invention and illustrates an example in which underexposure and overexposure occur in the image signal.

FIGS. 4(a), 4(b), and 4(c) illustrate histograms each corresponding to an image signal for one image. For the evaluation value, for example, variance σ of the histograms may be used as defined in Equation 4.

$$\sigma = \sum_{j=0}^{N} (Y_j - \overline{Y})^2 \quad [\text{Eq. 4}]$$

Here, Yj represents the luminance of the jth pixel; N represents the total number of pixels of the image signal; and Y(-) represents the average luminance. Here, a luminance value is used. In the case of RGB signals, however, the G signal may be used. When the image signal contains underexposure or overexposure, the variance value, i.e., evaluation value, of the histogram becomes small, as illustrated in FIGS. 4(b) and 4(c). On the other hand, when the image signal is appropriately exposed, the variance value, i.e., evaluation value, of the histogram becomes large, as illustrated in FIG. 4(a).

In addition to variance, an entropy value of the histogram may be used. Entropy E of the histogram is defined by Equation 5.

$$E = \sum_{Y=0}^{2^{bit}} \{-f(Y)\log f(Y)\} \quad [\text{Eq. 5}]$$

Here, bit represents the number of bits in the image signal, and f(Y) represents the frequency of a luminance value Y. Here, the frequency f(Y) is normalized such that the sum of the frequencies equals one. Entropy is maximized when the histogram is flat with respect to the luminance direction, i.e., when the frequency f(Y) is constant. Thus, in the case the histogram in FIG. 4, the entropy, i.e., evaluation value, of the histogram in FIG. 4(a), in which the frequency f(Y) is relatively evenly distributed, is maximized. Evaluation values are computed for all of the image signals for the plurality of images transferred from the buffer 400, and the computed evaluation values are transferred to the selecting unit 404. The selecting unit 404 extracts from the buffer 400 the signal for a frequency component corresponding to the largest evaluation value transferred from the evaluation-value computing unit 403 and transfers this to the high-frequency-component generating unit 112.

The low-frequency-component generating unit 111 extracts only low-frequency components from the frequency signals for the plurality of images acquired at the transform unit 109 and combines these by inverse transformation. In other words, only the frequency signals for low-frequency components are extracted from the frequency signals for the plurality of images; the frequency signals for only low-frequency components are transformed to image signals in real space; low-frequency image signals, which are image signals containing only low-frequency components, are generated; and addition processing is carried out on the transformed low-frequency image signals. At this time, the combining ratio of each of the low-frequency image signals can be set appropriately. Thus, as illustrated in FIG. 5, the low-frequency-component generating unit 111 includes a buffer 300, a low-frequency-component generating unit 301, an inverse-transform unit 302, a weighting-coefficient computing unit 303, and an adding unit 304.

The frequency signals for a plurality of images transferred from the transform unit 109 are stored in the buffer 300. These signals are transferred to the low-frequency-component generating unit 301. The low-frequency-component generating unit 301 reads the frequency signals for images one by one from the buffer 300 and extracts low-frequency components from the read frequency signals. When frequency signals are obtained through multiresolution transformation performed by the transform unit 109 according to this embodiment, the signals that finally pass through the horizontal low-pass filter 204 and the vertical low-pass filter unit 210 are extracted as low-frequency components of the frequency signals. The inverse-transform unit 302 transforms the frequency signals of the low-frequency components transferred from the low-frequency-component generating unit 301 to low-frequency image signals in real space containing only low-frequency components by inverse Fourier transformation, multiresolution inverse transformation, or the like. This process is carried out on the signals for all images stored in the buffer 300.

Figure 6:
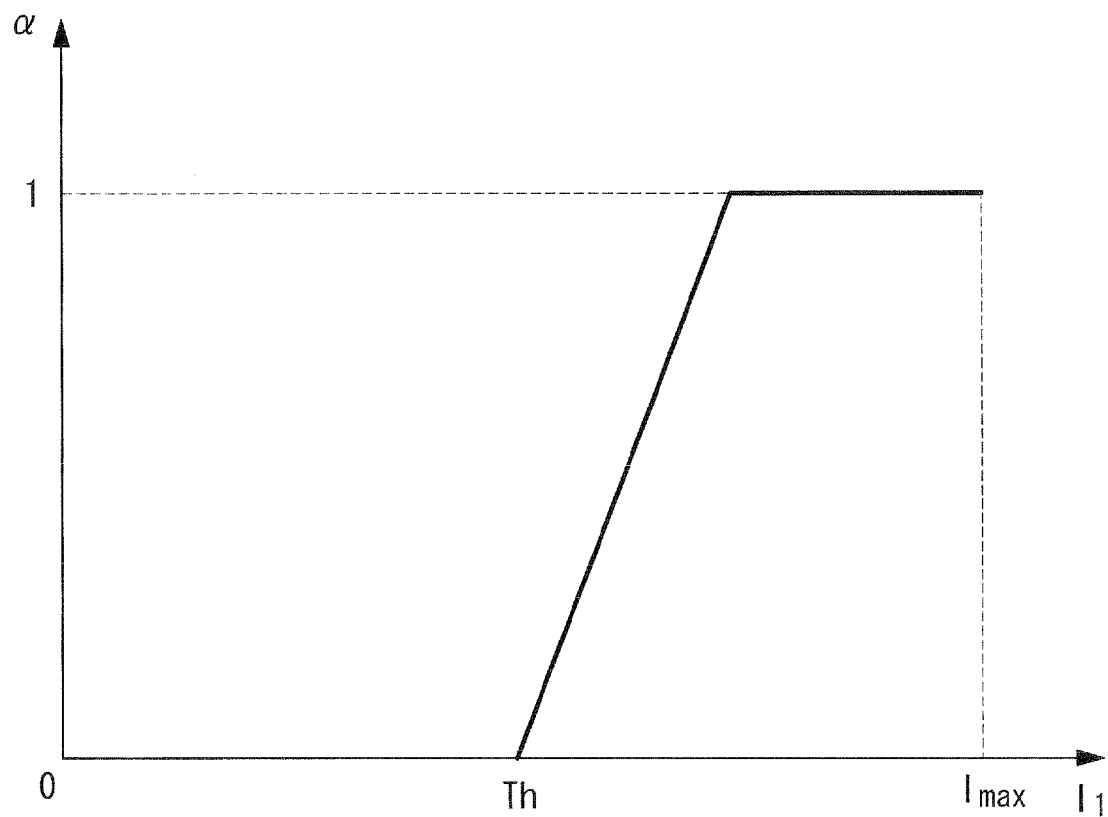
FIG. 6 is an explanatory diagram related to a weighting coefficient for the image processing apparatus according to the first embodiment of the present invention.
Figure 7:
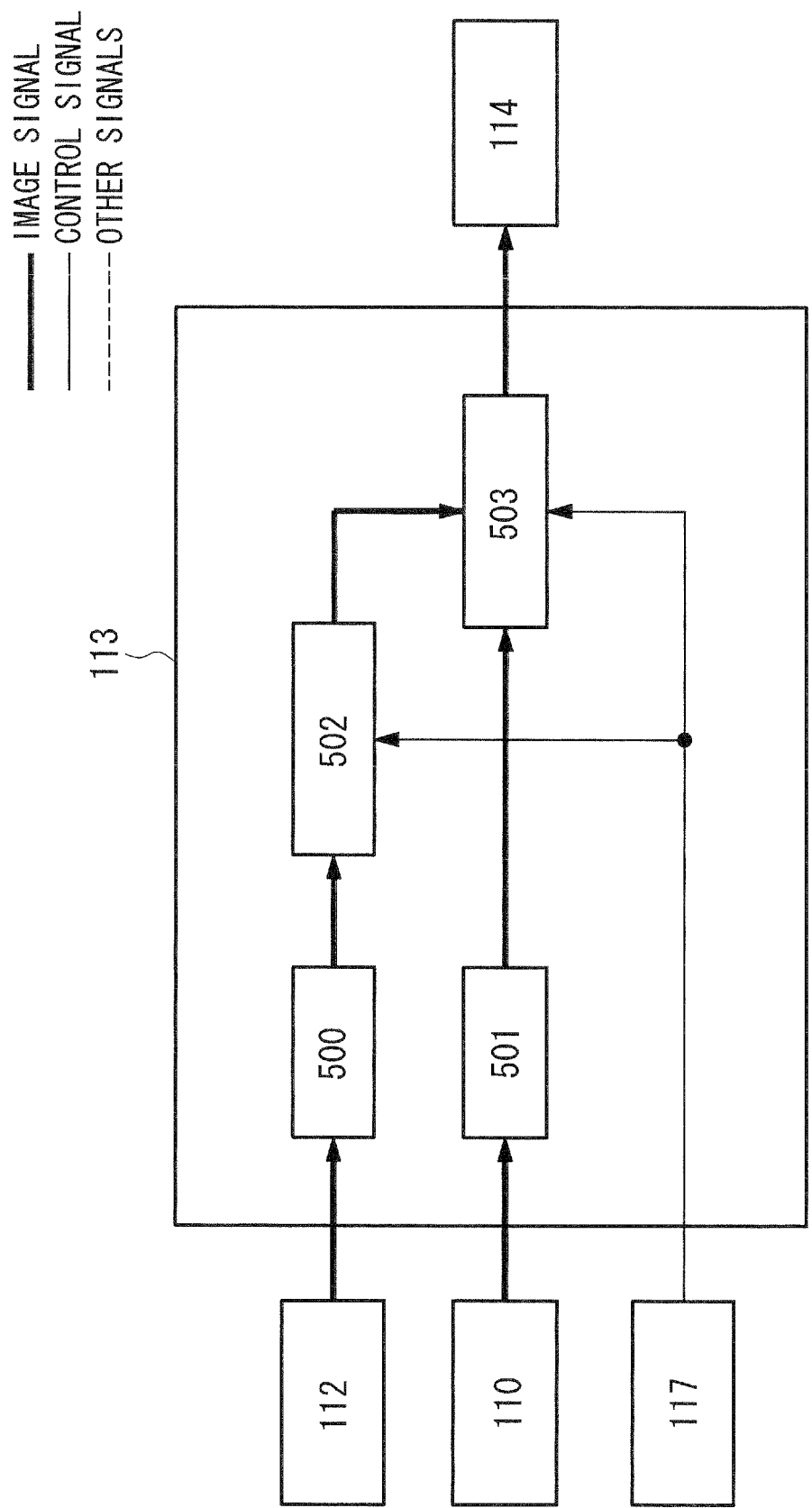
FIG. 7 is a block diagram illustrating, in outline, the configuration of an image combining unit of the image processing apparatus according to the first embodiment of the present invention.

The weighting-coefficient computing unit 303 computes a weighting coefficient α, which is the combination ratio of a plurality of images. FIG. 6 is a graph representing an example weighting coefficient. The graph in FIG. 6 illustrates a case in which image signals for two images are provided, where the weighting coefficient α is represented as a function for an input signal I1, which is the first low-frequency image signal of a plurality of low-frequency image signals, and illustrates a case in which the exposure level of a low-frequency image signal I2 is less than that of the low-frequency image signal I1 in other words, for a signal value greater than a threshold Th at which the low-frequency image signal might be saturated, the weight of the low-frequency image signal I2 acquired with low exposure is increased, and for a signal value smaller than or equal to the threshold Th, the weight of the low-frequency image signal I1 acquired with appropriate exposure is increased. By using such a weighting coefficient, it becomes possible to carry out addition taking into consideration the saturated part of a signal.

The adding unit 304 uses the following Equation 6 on the low-frequency image signals for a plurality of images transferred from the inverse-transform unit 302 to combine signal values at the same coordinates on the basis of the weighting coefficient computed by the weighting-coefficient computing unit 303, generates a combined low-frequency image signal, and outputs this combined low-frequency image signal to the image combining unit 113.

$$I'(x,y) = \alpha I1(x,y) + (1-\alpha)I2(x,y) \quad [\text{Eq. 6}]$$

Here, Equation 6 defines a case in which low-frequency image signals for two images are provided, where I' represents the combined low-frequency image signal, which is the signal acquired after combining, I1 and I2 respectively represent the first and second low-frequency image signals transferred from the inverse-transform unit 302, and (x,y) represents the coordinates of the low-frequency image signals. I1 and I2 may represent signals in respective channels in RGB signals or may represent YCbCr signals. When the low-frequency image signals are for three or more images, combining is carried out according to the following Equation 7.

$$I'(x, y) = \sum_{i=1}^{N} \beta_i I_i(x, y), \sum_{i=1}^{N} \beta_i = 1 \quad [\text{Eq. 7}]$$

Here, Ii represents the ith image signal, and βi represents a weighting coefficient.

In this embodiment, combining is carried out by weighting a plurality of images but is not limited thereto, and combining may be carried out by setting the combining ratio of the plurality of images equally and carrying out simple addition.

The high-frequency-component generating unit 112 extracts only high-frequency components from a frequency signal for one image transferred from the extracting unit 110, transforms the extracted frequency signal of only high-frequency components to a high-frequency image signal, in real space, containing only high-frequency components by carrying out the above-described inverse-conversion processing, and transfers this to the image combining unit 113.

The image combining unit 113 adds the signal values of the same coordinates in the high-frequency image signal from the high-frequency-component generating unit 112 and the combined low-frequency image signal combined at the low-frequency-component generating unit 111 and transfers the sum to the gradation transform unit 114. Since the high-frequency image signal might include noise, it is preferable to carry out addition processing after reducing noise. Therefore, the image combining unit 113 includes buffers 500 and 501, a noise reducing unit 502, and an adding unit 503. The high-frequency image signal transferred from the high-frequency-component generating unit 112 is temporarily stored in the buffer 500 and is then transferred to the noise reducing unit 502. The noise reducing unit 502 reduces noise in the high-frequency image signal using a smoothing filter or a median filter. The adding unit 503 generates a combined image signal by carrying out addition processing at the same coordinates in the noise-reduced high-frequency image signal and the combined low-frequency image signal transferred from the buffer 501 and transfers the sum to the gradation transform unit 114.

The gradation transform unit 114 carries out gradation conversion processing, by using gamma transforms or a tone curve, on the combined image signal transferred from the image combining unit 113 and transfers the signal to the compressing unit 115.

Figure 8:
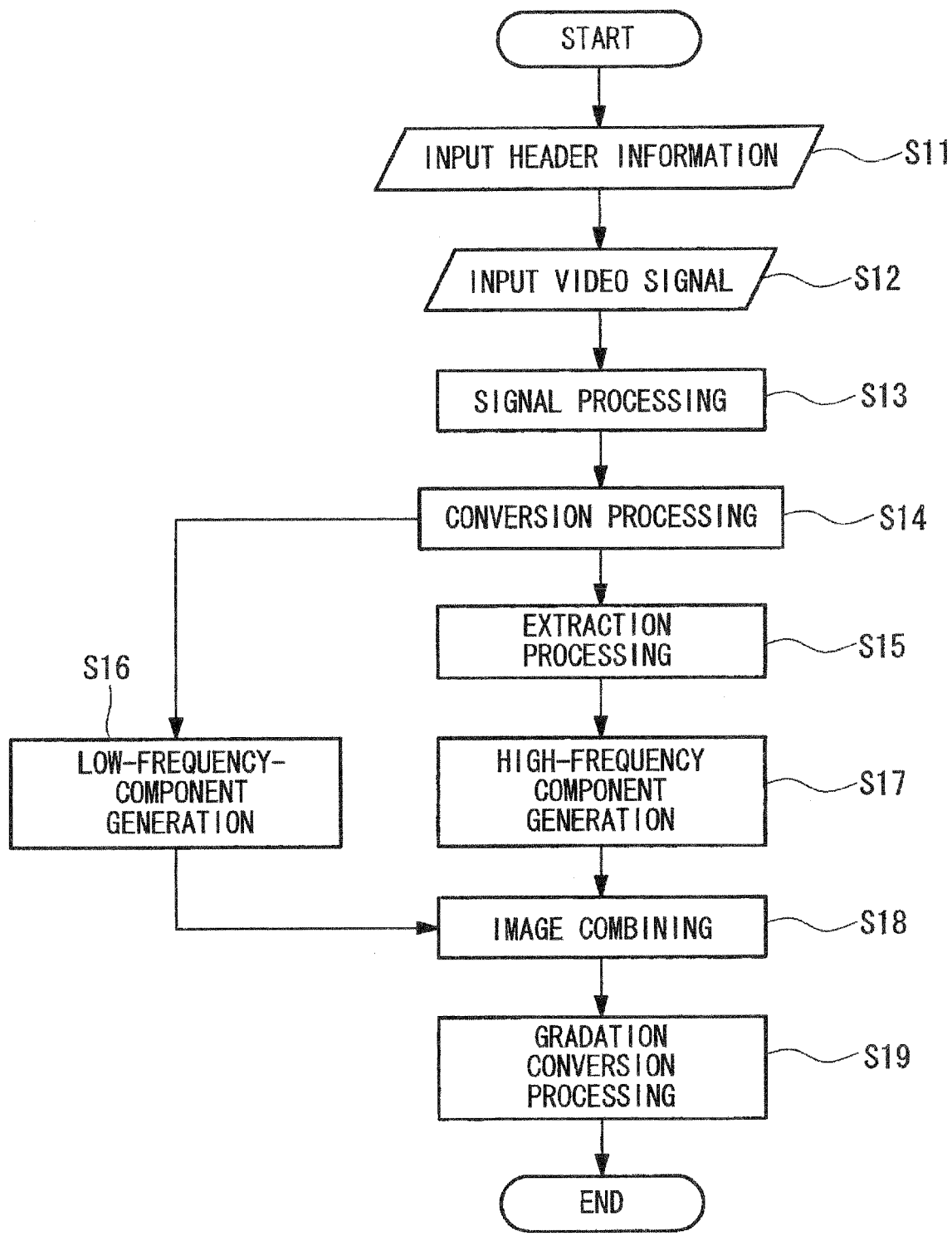
FIG. 8 is a flow chart illustrating the process of image combining processing performed by the image processing apparatus according to the first embodiment of the present invention.
Figure 9:
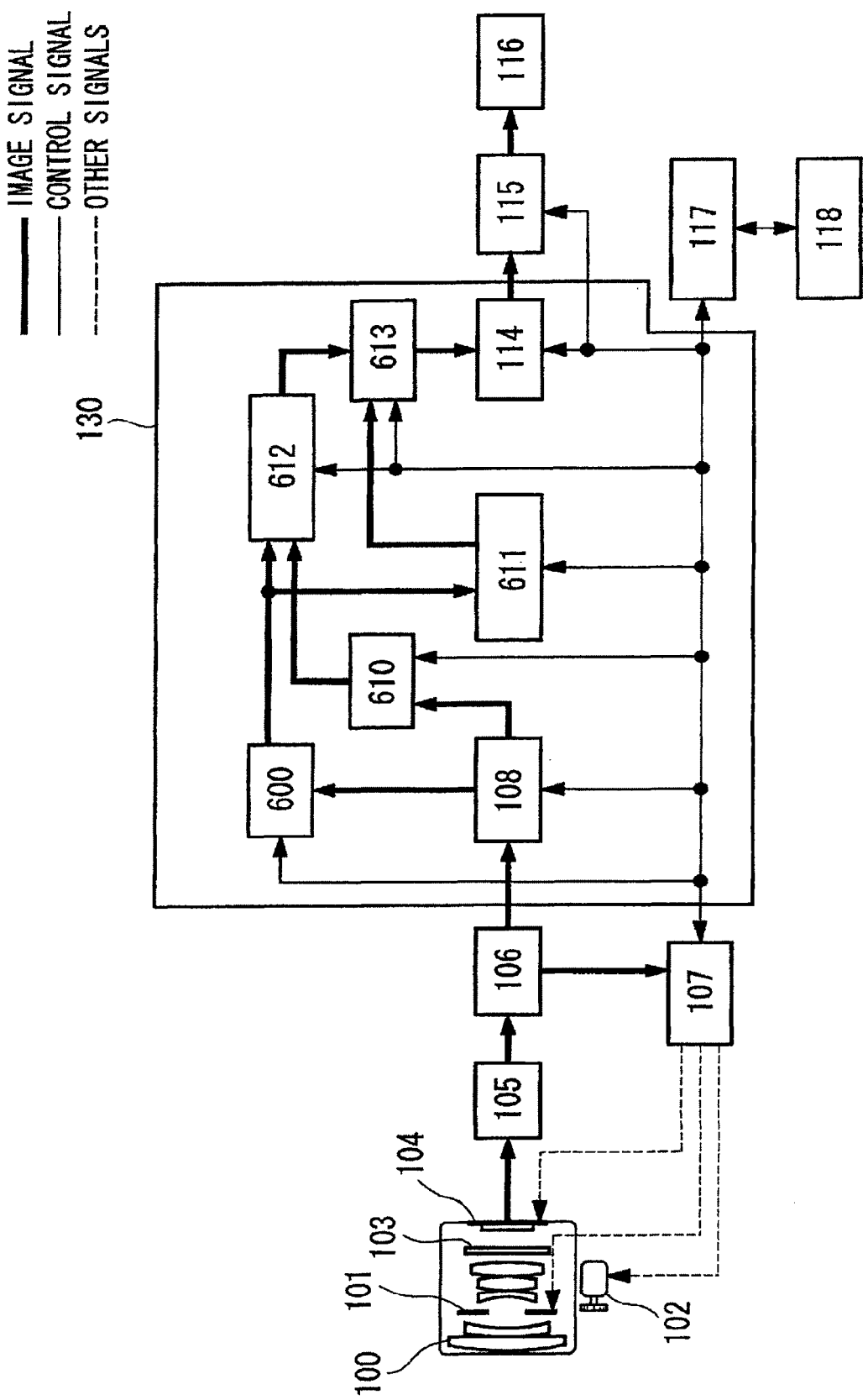
FIG. 9 is a block diagram illustrating, in outline, the configuration of an image processing apparatus according to a second embodiment of the present invention.

The processes in image combining processing carried out by the thus-configured image processing apparatus of this embodiment will be described below with reference to the flow chart in FIG. 8.

In the image processing apparatus, after image-acquisition conditions, such as ISO speed and exposure, are set via the external I/F unit 118, a preliminary image acquisition mode is set by pressing a shutter button (not shown) halfway. Then, after preliminary image acquisition is carried out the same number of times as the number of times image acquisition is carried out in the actual image acquisition, by fully pressing the shutter button (not shown) via the external I/F unit 118, the actual image acquisition is carried out. The actual image acquisition is carried out on the basis of the focus condition and the exposure condition defined at the image-acquisition control unit 107, and this image acquisition information is transferred to the control unit 117. Hereinafter, for the sake of convenience, it is assumed that the number of times image acquisition is carried cut in the actual image acquisition is two, and that an image signal S1 with an appropriate amount of incident light and an image signal S2 with a different amount of incident light, such as half the amount of the incident light of the image signal S1, are acquired in these two image acquisitions.

In Step S11, an image signal from the CCD 104 is read as raw data, which includes the ISO speed information, image signal size, and so on read as header information, and then the process goes to Step S2. In Step S12, the image signals S1 and S2 acquired through the lens system 100, the stop 101, the color filter 103, and the CCD 104 are converted to digital image signals at the A/D converting unit 105 and are input to the buffer 106. In Step S13, signal processing, such as interpolation processing, white balance adjustment processing, Y/C signal generation processing, electronic zoom processing, and noise suppression processing, are carried out by the signal processing unit 108, and then the process goes to Step S14.

In Step S14, the image signals S1 and S2 on which predetermined signal processing is carried out by the transform unit 109 are transformed to frequency signals, which are frequency component signals, by multiresolution transformation, and then the process goes to Step S15. In Step S15, the extracting unit 110 evaluates which image signal is most suitable for image combining by generating a histogram based on the frequency signals S1 and S2 for two images, extracts the frequency signal associated with the image signal for one image that is most suitable for image combining, and outputs this frequency signal for one image to the high-frequency-component generating unit 112.

In Step S17, the high-frequency-component generating unit 112 extracts a signal for a high-frequency component from the frequency signal for one image of the image signal S1, which is input from the extracting unit 110, transforms this to an image signal in real space containing only high-frequency components, and generates a high-frequency image signal containing only high-frequency components. Then, outputs the generated high-frequency image signal S1 containing only high-frequency components to the image combining unit 113.

In Step S16, the low-frequency-component generating unit 111 extracts low-frequency components from the frequency component signals S1 and S2, transforms these to image signals in real space, generates low-frequency image signals containing only low-frequency components, carries out addition processing on the transformed low-frequency image signals S1 and S2 by taking weighting into consideration, and generates a combined low-frequency image signal.

In Step S18, the image combining unit 113 generates a combined image signal by carrying out addition processing, i.e., image combining, on the high-frequency image signal S1 and the combined low-frequency image signal. The combined image signal is output to the gradation transform unit 114, and then the process goes to Step S19. In Step S19, the gradation transform unit 114 carries out predetermined gradation conversion processing on the input combined image signal, and then this routine ends. The combined image signal on which gradation conversion processing is carried out is output to the compressing unit 115, and, at the compressing unit 115, it is subjected to compression processing, such as JPEG compression, and then is output to the outputting unit 116.

In this way, by setting low-frequency components, in which blur is not easily noticeable, for a plurality of images in the image signals to be subjected to the image combining processing and, at the same time, by setting high-frequency components, in which blur is easily noticeable, for any one image to be subjected to the image combining process, a combined signal having a wide dynamic range without artifacts, such as double lines, can be generated even for the image signals of a plurality of images with blur.

Second Embodiment

A second embodiment of the present invention will be described below with reference to the drawings.

In an image processing apparatus according to this embodiment, the configuration of an image processing unit 130 differs from the configuration of the image processing unit 120 according to the above-described first embodiment of the present invention. In other words, the image processing unit 130 does not transform image signals to frequency signals as in the first embodiment, but carries out the subsequent image combining processing by extracting a low-frequency image signal corresponding to a low-frequency component from image signals and, at the same time, extracting a high-frequency image signal from the image signals by computing the difference with the low-frequency image signal. Hereinafter, components that are the same as those of the first embodiment will be represented by the same reference numerals, descriptions thereof will be omitted, and differences will be mainly described.

The image processing unit 130 includes a signal processing unit 108, a transform unit 600, which is a low-frequency-image signal generating unit, an extracting unit 610, a low-frequency-component generating unit 611, which is a combined-low-frequency-signal generating unit, a high-frequency-component generating unit 612, which is a high-frequency-image signal generating unit, an image combining unit 613, and a gradation transform unit 114.

The transform unit 600 generates low-frequency image signals containing only low-frequency components by applying a smoothing filter, etc. to image signals transferred from the signal processing unit 108; and the low-frequency image signals are transferred to the low-frequency-component generating unit 611 and the high-frequency-component generating unit 612.

Figure 10:
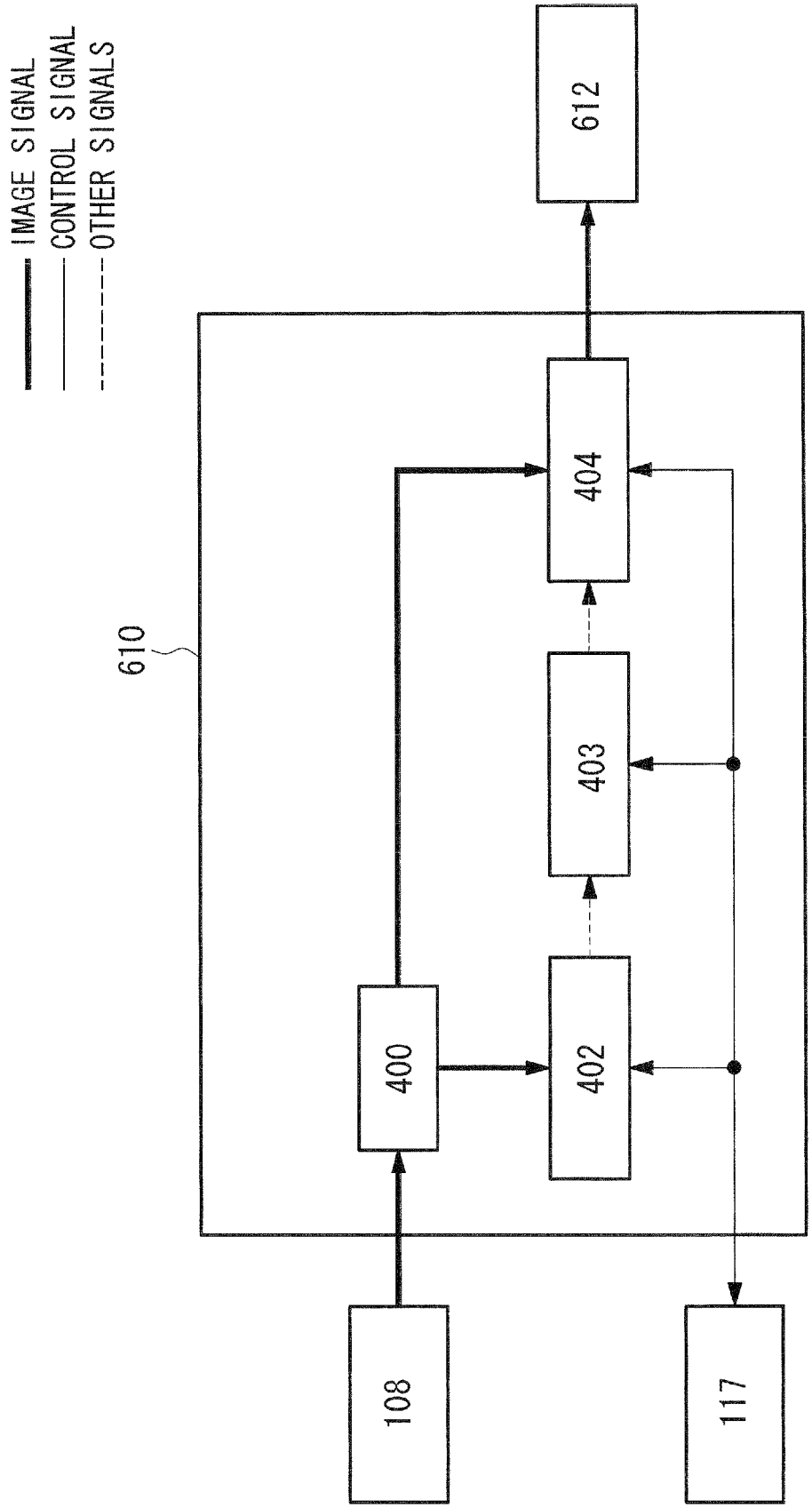
FIG. 10 is a block diagram illustrating, in outline, the configuration of an extracting unit of the image processing apparatus according to the second embodiment of the present invention.
Figure 11:
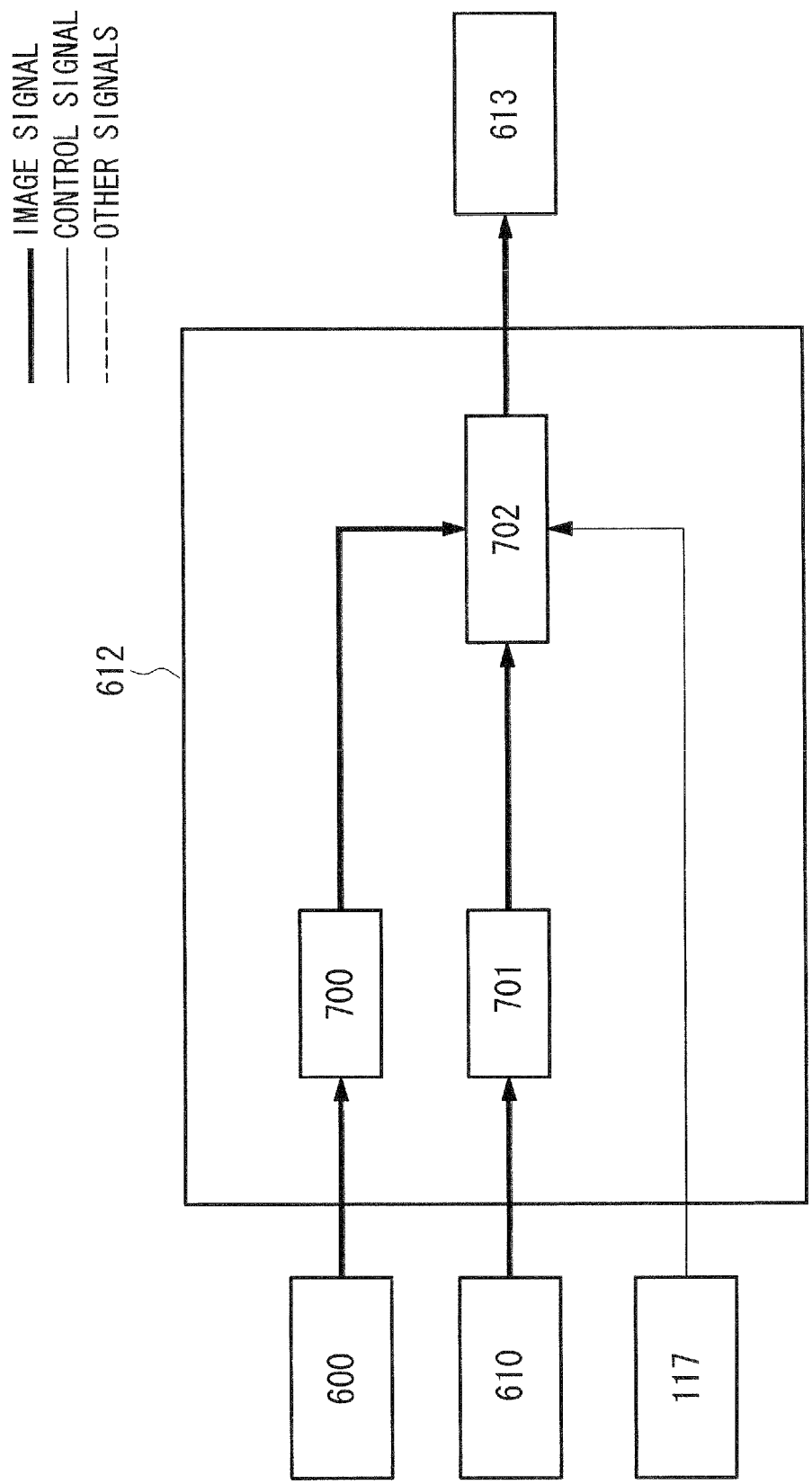
FIG. 11 is a block diagram illustrating, in outline, the configuration of a high-frequency-component generating unit of the image processing apparatus according to the second embodiment of the present invention.

The extracting unit 610 extracts one predetermined image that is most suitable for image combining from the image signals for a plurality of images transferred from the signal processing unit 108, and includes a buffer 400, a histogram computing unit 402, an evaluation-value computing unit 403, and a selecting unit 404, as illustrated in FIG. 10. This differs from the configuration of the extracting unit 110 of the first embodiment in that the inverse-transform unit 401 is not provided. The image signals for a plurality of images transferred from the signal processing unit 108 are stored in the buffer 400. The histogram computing unit 402 and the evaluation-value computing unit 403 compute histograms on the basis of the image signals stored in the buffer 400 in a manner similar to that of the histogram computing unit 402 and the evaluation-value computing unit 403 according to the first embodiment, and compute evaluation values from the computed histogram information. The selecting unit 404 extracts an image signal for one image selected from the buffer 400 on the basis of the evaluation values. The extracted image signal for one image is transferred to the high-frequency-component generating unit 612.

The high-frequency-component generating unit 612 generates a high-frequency image signal by subtracting the low-frequency image signal from the image signal for one image extracted by the extracting unit 610 and includes buffers 700 and 701 and a subtraction signal computing unit 702. The low-frequency image signals for a plurality of images input from the transform unit 600 are stored in the buffer 700. The image signal for one image input from the extracting unit 610 is stored in the buffer 701. The subtraction signal computing unit 702 generates a high-frequency image signal by reading out a low-frequency image signal equivalent to the image signal extracted by the extracting unit 610 from the buffer 700 under the control of the control unit 117 and by subtracting the low-frequency image signal from the image signal for one image in the buffer 701, i.e., by carrying out subtraction processing at each coordinate (x,y) represented by the following Equation 8.

$$H(x,y)=S1(x,y)-T1(x,y) \quad [\text{Eq. 8}]$$

Here, H(x,y) represents a high-frequency image signal after subtraction processing; S1 represents an image signal for one image input from the extracting unit 610; and T1 represents a low-frequency image signal equivalent to the image signal extracted by the extracting unit 610. The generated high-frequency image signal H(x,y) is output to the image combining unit 613.

Figure 12:
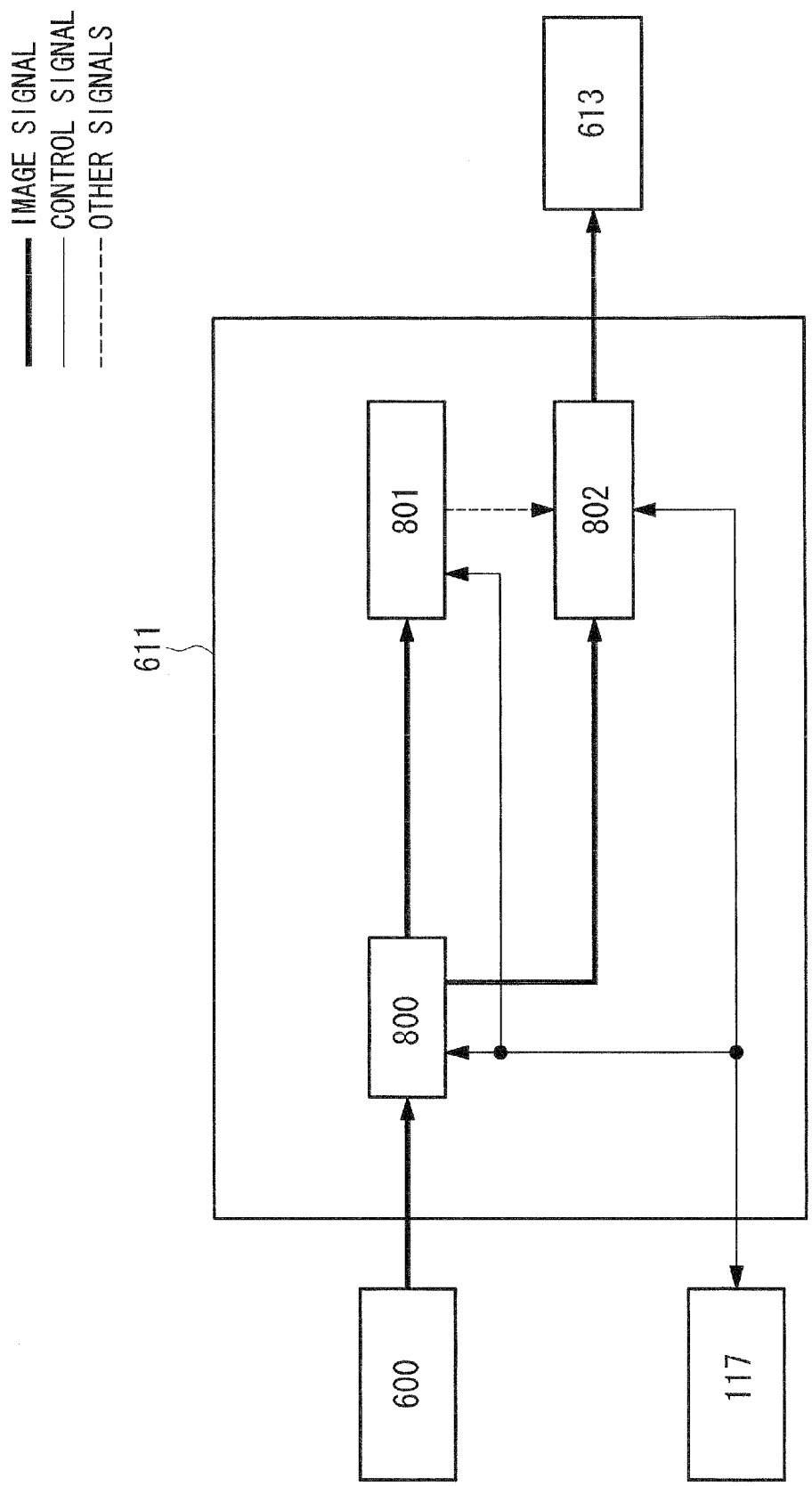
FIG. 12 is a block diagram illustrating, in outline, the configuration of a low-frequency-component generating unit of the image processing apparatus according to the second embodiment of the present invention.

The low-frequency-component generating unit 611 combines the plurality of low-frequency image signals transferred from the transform unit 600 to generate a combined low-frequency image signal. Therefore, as shown in FIG. 12, it includes a buffer 800, a weighting-coefficient calculating unit 801, and an adding unit 802. This differs from the low-frequency-component generating unit 111 in the first embodiment in that the low-frequency-component generating unit 301 and the inverse-transform unit 302 are not provided.

The low-frequency image signals for a plurality of images input from the transform unit 600 are stored in the buffer 800. The adding unit 802 carries out simple addition or weighted addition on the low-frequency image signals output from the buffer 800 in a manner similar to that in the first embodiment, and combines the low-frequency image signals to generate a combined low-frequency image signal. The generated combined low-frequency image signal is output to the image combining unit 613. The image combining unit 613 adds the signal values at the same coordinates in the high-frequency image signal from the high-frequency-component generating unit 612 and the combined low-frequency image signal combined at the low-frequency-component generating unit 611 and transfers the sum to the gradation transform unit 114. Since the image signal of the high-frequency component may include noise, it is preferable that the addition processing be carried out after noise reduction.

Figure 13:
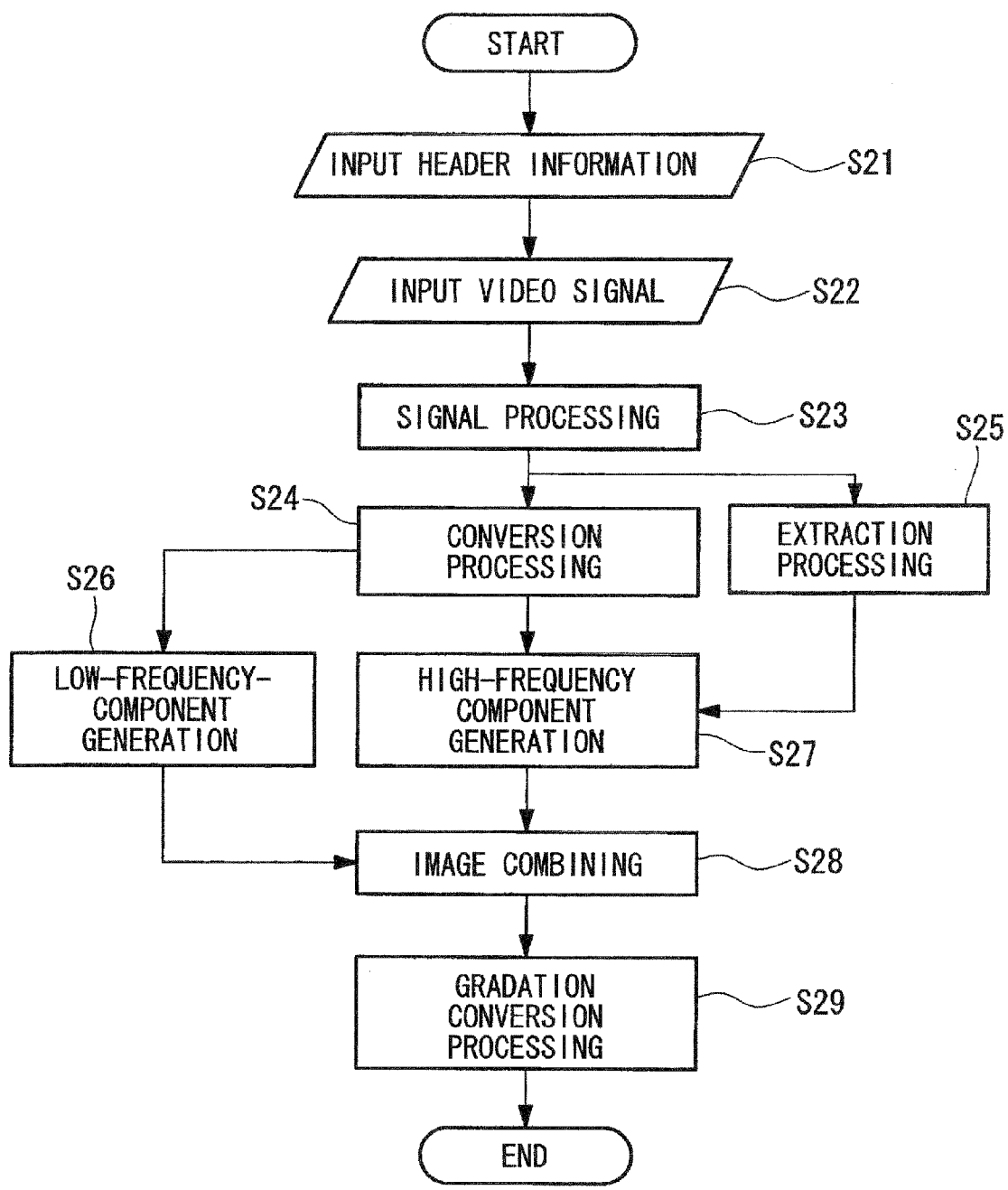
FIG. 13 is a flow chart illustrating the process of image combining processing performed by the image processing apparatus according to the second embodiment of the present invention.

The processes in image combining processing carried out by the thus-configured image processing apparatus of this embodiment will be described below with reference to the flow chart in FIG. 13.

With the image processing apparatus, after the image-acquisition conditions, such as ISO speed and exposure, are set via the external I/F unit 118, a preliminary image acquisition mode is set by pressing a shutter button (not shown) halfway. Then, after preliminary image acquisition is carried out the same number of times as the number of times image acquisition is carried out in the actual image acquisition, by fully pressing the shutter button (not shown) via the external I/F unit 118, the actual image acquisition is carried out. The actual image acquisition is carried out on the basis of the focus condition and the exposure condition defined at the image-acquisition control unit 107, and this image acquisition information is transferred to the control unit 117. Hereinafter, for the sake of convenience, it is assumed that the number of times image acquisition is carried out in the actual image acquisition is two, and that an image signal S1 with an appropriate amount of incident light and an image signal S2 with a different amount of incident light, such as half the amount of the incident light of the image signal S1, are acquired in these two image acquisitions.

In Step S21, an image signal from the CCD 104 is read as raw data, which includes the ISO speed information, image signal size, and so on read as header information, and then the process goes to Step S22. In Step S22, the image signals S1 and S2 acquired through the lens system 100, the stop 101, the color filter 103, and the CCD 104 are converted to digital image signals at the A/D converting unit 105 and are input to the buffer 106. In Step S23, signal processing, such as interpolation processing, white balance adjustment processing, Y/C signal generation processing, electronic zoom processing, and noise suppression processing, are carried out by the signal processing unit 108, and then the process goes to Step S24.

In Step S24, a low-frequency image signal is generated from an image signal at the transform unit 600; the generated low-frequency image signal is output to the high-frequency-component generating unit 612; and the process goes to Step S25. In Step S25, the extracting unit 610 evaluates which image signal is most suitable for image combining by generating a histogram based on the frequency signals S1 and S2 for two images, extracts the frequency signal associated with the image signal for one image that is most suitable for image combining, and outputs this frequency signal for one image to the high-frequency-component generating unit 612. In Step S26, the high-frequency-component generating unit 612 generates a high-frequency image signal by carrying out subtraction processing between the image signal for one image and the low-frequency image signal equivalent to this image signal for one image.

In Step S27, the low-frequency-component generating unit 611 carries out addition processing of the low-frequency image signals S1 and S2 to generate a combined low-frequency image signal. In Step S28, the image combining unit 613 generates a combined image signal by carrying out addition processing of the high-frequency image signal S1 and the combined low-frequency image signal and outputs the combined image signal to the gradation transform unit 114. In Step S29, the gradation transform unit 114 carries out predetermined gradation conversion processing on the input combined image signal, and then this routine ends. The combined image signal on which gradation conversion processing is carried out is output to the compressing unit 115, and, at the compressing unit 115, is subjected to compression processing, such as JPEG compression, and is output to the outputting unit 116.

In this way, similar to the first embodiment, by setting only low-frequency components, in which blur is not easily noticeable, of a plurality of images in the image signals to be subjected to the combining processing and, at the same time, setting a high-frequency component, in which blur is easily noticeable, of any one image to be subjected to the combining process, a combined signal having a wide dynamic range without artifacts, such as double lines, can be generated even for image signals of a plurality of images with blur. By carrying out extraction of the low-frequency signals in real space, high-speed image signal processing is possible.

The above-described first and second embodiments assume processing by hardware. The present invention, however, is not limited to such a configuration. Instead, for example, configuration for processing by software is also possible. In such a case, the image processing apparatus includes a CPU, a main storage device, such as PAM, and a computer-readable recording medium on which a program for realizing the entire process or part of the process is recorded. Then, upon reading out the program recorded in the above-mentioned recording medium and carrying out processing and computation on the information, the CPU realizes the same processing as that realized by the above-described image processing apparatus.

Here, the computer-readable recording medium means a magnetic disk, a magneto-optic disk, a CD-ROM, a DVD-ROM, a semiconductor memory, etc. Furthermore, this computer program may be distributed to a computer through a communication line, and the computer may execute the program upon receiving it.

What is claimed is:

1. An image processing apparatus that expands dynamic range by combining a plurality of image signals, the apparatus comprising:
    an image signal acquiring unit configured to acquire a plurality of image signals having different exposure levels;
    a low-frequency-image signal generating unit configured to generate a plurality of low-frequency image signals by extracting low-frequency components from each of the image signals;
    a combined-low-frequency-signal generating unit configured to combine the plurality of low-frequency image signals to generate a combined low-frequency image signal;
    an extracting unit configured to extract a single image signal from the plurality of image signals;
    a high-frequency-image signal generating unit configured to extract a high-frequency component from only the single image signal to generate a high-frequency image signal; and
    an image combining unit configured to generate a combined image signal by combining the combined low-frequency image signal and the high-frequency image signal extracted from only the single image signal.

2. The image processing apparatus according to claim 1, further comprising:
    a frequency-signal generating unit configured to generate a frequency signal by carrying out frequency transformation on the image signal,
    wherein the low-frequency-image signal generating unit extracts a low-frequency component from the frequency signal to generate a low-frequency signal and generates a low-frequency image signal by inversely transforming the low-frequency signal, and
    wherein the high-frequency-image signal generating unit extracts a high-frequency component from the frequency signal corresponding to the single image signal to generate a high-frequency signal and extracts the high-frequency image signal by inversely transforming the high-frequency signal.

3. The image processing apparatus according to claim 2, wherein the frequency-signal generating unit generates the frequency signal by carrying out multiresolution transformation on the image signal.

4. The image processing apparatus according claim 1, further comprising:
    a weight computing unit configured to compute weighting coefficients based on pixel values of the plurality of low-frequency image signals, the weighting coefficients being combining ratios of the plurality of low-frequency image signals,
    wherein the combined-low-frequency-image signal generating unit carries out the combining by weighting the plurality of low-frequency image signals based on the weighting coefficients.

5. The image processing apparatus according to claim 1, wherein the extracting unit includes:
    a histogram computing unit configured to compute a histogram for each image signal, the histogram representing a level of variance of luminance values of pixels constituting each of the image signals,
    an evaluation-value computing unit configured to compute a variance value of luminance values of the pixels from the histogram and set the variance value as an evaluation value, and
    a selecting unit configured to select an image signal having the maximum evaluation value as the single image signal.

6. The image processing apparatus according to claim 1, wherein the high-frequency-image signal generating unit generates the high-frequency image signal by computing a difference between the single image signal and a corresponding low-frequency image signal.

7. The image processing apparatus according to claim 1, wherein the image combining unit adds the combined low-frequency image signal and the high-frequency image signal extracted from only the single image signal.

8. The image processing apparatus according to claim 1, wherein the image combining unit:
    includes a noise reducing unit configured to carry out noise reduction processing on the high-frequency image signal extracted from only the single image signal, and
    adds the combined low-frequency image signal and the high-frequency image signal in which noise is reduced by the noise reducing unit.

9. A non-transitory computer-readable recording medium having stored thereon an image processing program for expanding dynamic range by combining a plurality of image signals, the image processing program being executable by a computer to perform functions comprising:
    acquiring a plurality of image signals having different exposure levels;
    generating a plurality of low-frequency image signals by extracting low-frequency components from each of the plurality of image signals;
    combining the plurality of low-frequency image signals to generate a combined low-frequency image signal;
    extracting a single image signal from the plurality of image signals;
    extracting a high-frequency component from only the single image signal to generate a high-frequency image signal; and
    generating a combined image signal by combining the combined low-frequency image signal and the high-frequency image signal extracted from only the single image signal.

10. A method of expanding dynamic range by combining a plurality of image signals, the method comprising:
    acquiring a plurality of image signals having different exposure levels;

generating a plurality of low-frequency image signals by extracting low-frequency components from each of the plurality of image signals;

combining the plurality of low-frequency image signals to generate a combined low-frequency image signal;

extracting a single image signal from the plurality of image signals;

extracting a high-frequency component from only the single image signal to generate a high-frequency image signal; and generating a combined image signal by combining the combined low-frequency image signal and the high-frequency image signal extracted from only the single image signal.

* * * * *